(12) United States Patent
Patel et al.

(10) Patent No.: US 11,889,020 B2
(45) Date of Patent: Jan. 30, 2024

(54) METHOD AND SYSTEM FOR CHALLENGING POTENTIAL UNWANTED CALLS

(71) Applicants: AT&T Intellectual Property I, L.P., Atlanta, GA (US); AT&T Mobility II LLC, Atlanta, GA (US)

(72) Inventors: Vimal Patel, Morganville, NJ (US); Howard Lang, Wayside, NJ (US); Karen Stansbury, St Simons Island, GA (US); Derek Baylor, Mableton, GA (US); James Ibezim, Wayside, NJ (US); Nalini Humphrey, Lawrenceville, GA (US); Robert Stokey, Jr., Manville, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 105 days.

(21) Appl. No.: 17/466,595

(22) Filed: Sep. 3, 2021

(65) Prior Publication Data
US 2023/0075625 A1    Mar. 9, 2023

(51) Int. Cl.
H04M 3/436    (2006.01)
H04M 3/53    (2006.01)
H04M 3/42    (2006.01)

(52) U.S. Cl.
CPC ..... *H04M 3/4365* (2013.01); *H04M 3/42221* (2013.01); *H04M 3/53* (2013.01); *H04M 2201/40* (2013.01); *H04M 2203/551* (2013.01); *H04M 2250/60* (2013.01)

(58) Field of Classification Search
CPC ............... H04M 3/4365; H04M 3/436; H04M 2203/6072; H04M 223/551
USPC .......................................................... 455/415
See application file for complete search history.

(56) References Cited

U.S. PATENT DOCUMENTS

| 9,402,170 | B1 * | 7/2016 | Shaltiel | ............. H04M 1/72436 |
| 10,523,814 | B1 * | 12/2019 | Moore | ................... H04M 3/493 |
| 2008/0214141 | A1 * | 9/2008 | Burdick | ............ H04M 3/42195 455/404.1 |

(Continued)

FOREIGN PATENT DOCUMENTS

CN    103139374 A  *  6/2013  .............. H04M 3/02

*Primary Examiner* — Ahmad F. Matar
*Assistant Examiner* — Jirapon Tulop
(74) *Attorney, Agent, or Firm* — Guntin & Gust, PLC; Andrew Gust

(57) ABSTRACT

Aspects of the subject disclosure may include, for example, detecting, over a network, a call originating from a call originator and intended for a user of a user equipment, responsive to the detecting the call, determining whether to challenge the call originator, based on a determination to challenge the call originator, transmitting a request to the call originator, wherein the request prompts the call originator to specify an identity of the call originator and a purpose for the call, obtaining information from a call originator input responsive to the transmitting the request, deriving enhanced Caller Name or Caller ID data that includes the information, and causing the enhanced Caller Name or Caller ID data to be provided to the user equipment, thereby enabling the user of the user equipment to determine whether to answer the call. Other embodiments are disclosed.

20 Claims, 8 Drawing Sheets

(56) References Cited

U.S. PATENT DOCUMENTS

| | | | |
|---|---|---|---|
| 2014/0274001 A1* | 9/2014 | Kim | H04M 3/4365 |
| | | | 455/415 |
| 2018/0302513 A1* | 10/2018 | Cohen | H04M 3/42382 |
| 2020/0404098 A1* | 12/2020 | Bouvet | H04M 3/436 |
| 2022/0086277 A1* | 3/2022 | Murphy | H04M 3/42042 |
| 2022/0345570 A1* | 10/2022 | Garg | H04M 3/436 |

* cited by examiner

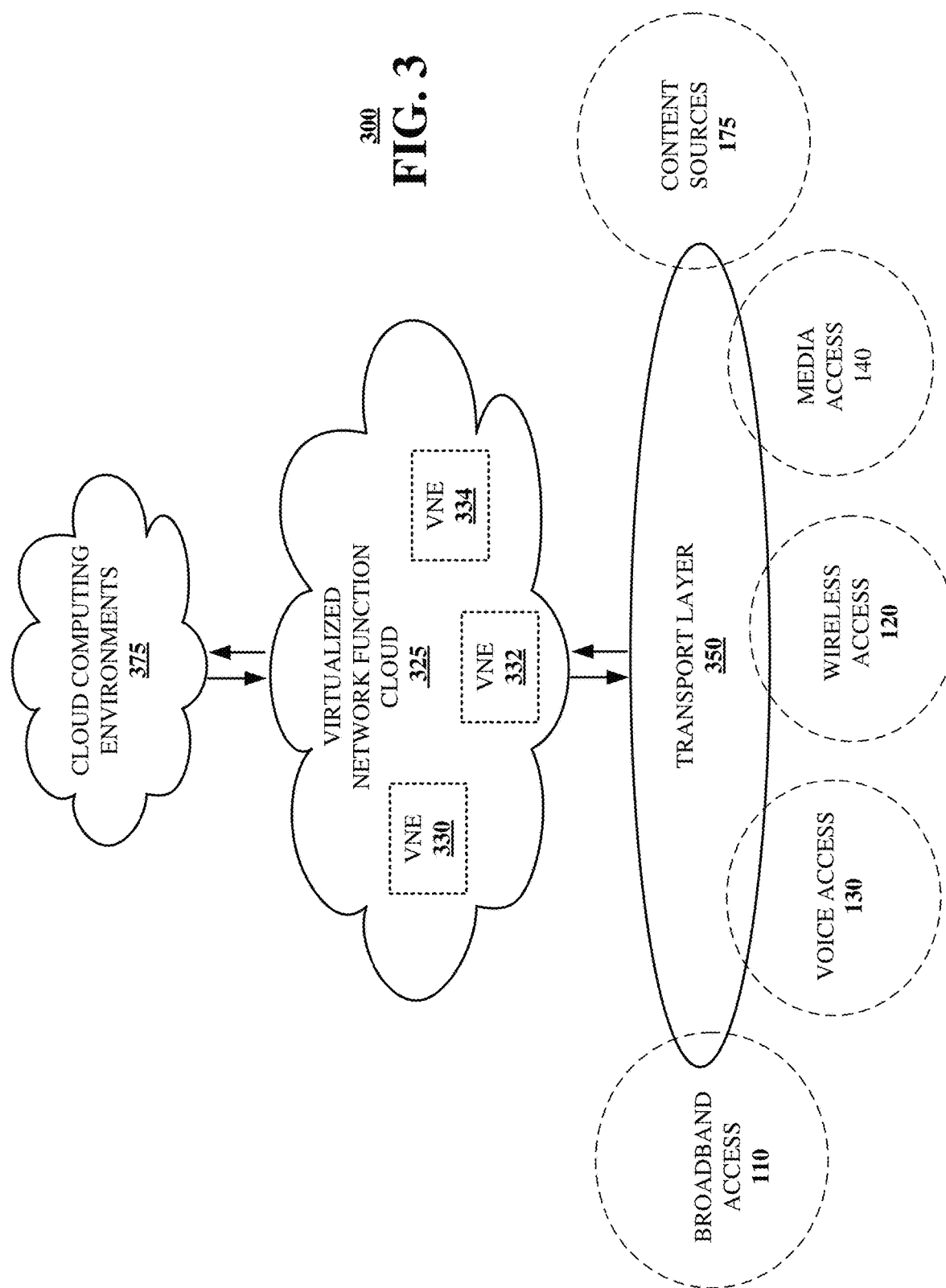

METHOD AND SYSTEM FOR CHALLENGING POTENTIAL UNWANTED CALLS

FIELD OF THE DISCLOSURE

The subject disclosure relates to challenging potential unwanted calls.

BACKGROUND

Mobile phone subscribers have become increasingly frustrated with unwanted automated calls (also known as robocalls). Robocall analytics services may generally block calls that are clearly spam or fraudulent. While users can add their phone numbers to a do-not-call registry, some robocallers ignore the registry altogether, utilize workarounds (via spoofing), or otherwise fail to get flagged by analytics service(s).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
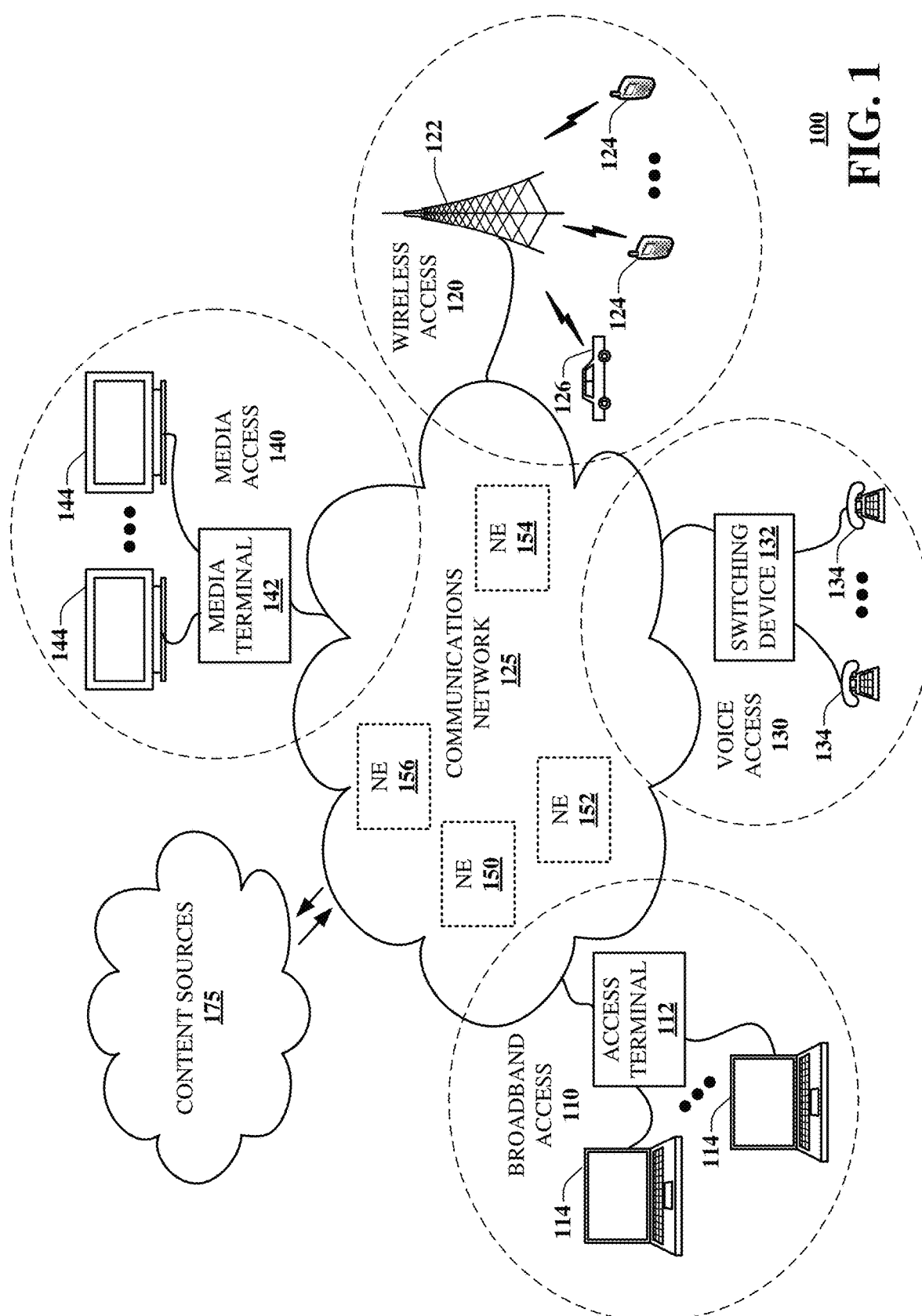
FIG. 1 is a block diagram illustrating an exemplary, non-limiting embodiment of a communications network in accordance with various aspects described herein.

In some instances, a robocall analytics service may undesirably block a legitimate caller or robocall. For example, an analytics service may undesirably block out calls that originate from an unfamiliar, but legitimate source, such as a school closure call made by a school or automated calling service, an (automated) appointment reminder from a medical office, an outstanding vehicle recall alert by a car manufacturer or third-party affiliate, or the like. It might be possible to address the problem of blocking legitimate, human callers by using an audio captcha-based solution where a caller is asked to answer a simple question (e.g., "how many sides to a triangle?"). However, this nevertheless fails to ascertain, for a call recipient, the underlying intent of the call, and also does not account for legitimate, automated callers.

The subject disclosure describes, among other things, illustrative embodiments of a call protection platform that is capable of detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer). In exemplary embodiments, the call protection platform may utilize a real-time (or near real-time) query and speech-to-text function to obtain a recording, from a caller, regarding the caller's identity and reason for the call, and derive an audio transcription of the recording. In various embodiments, the call protection platform may generate enhanced Caller Name (or Caller ID) data that includes a default Caller Name (or Caller ID), if any (e.g., as may be obtained via a telephone database lookup), as well as at least a portion of the audio transcription, and may provide the enhanced Caller Name (or Caller ID) data to the call recipient's user equipment for display or output. In some embodiments, the call protection platform may provide, to the call recipient's user equipment, information regarding the caller's identity and reason for the call in other manners, such as via text messaging, audibly (which may, e.g., aid those who are visually impaired), haptically, or the like, as described herein. In one or more embodiments, the call protection platform may perform some or all of the aforementioned functions as part of a live call flow for certain types of callers, such as, for example, unknown callers (e.g., those determined not to be associated with the call recipient, those determined to have no known history of communicating with the call recipient, etc.), which may be potential unwanted or fraudulent (e.g., illegal) callers.

Ascertaining and conveying the identity of a caller and/or the intent of a call, in real-time (or near real-time), enables a call recipient to make an informed decision on whether to answer the call, thereby improving overall user experience. Challenging callers, as described herein, can also avoid inadvertently blocking a legitimate robocall. Providing the call recipient with a transcription of a short, recorded message from the caller, for example, can reveal the identity of the caller—i.e., whether the caller is an unwanted robocaller or a legitimate one, and even in a case where the caller has enabled a private Caller Name (or Caller ID) feature. Embodiments in which functions of the call protection platform are implemented in a network system, as described herein, also reduces or eliminates a need to modify (or develop additional applications for) user equipment for purposes of providing call challenging. Enabling call recipients to make informed decisions on whether to answer calls—e.g., to ignore unwanted robocallers— can also discourage such callers from conducting fruitless calls over time, which can relieve network congestion and improve overall network performance. In exemplary embodiments, the call protection platform may also obtain statistics based on analyses of data regarding call recipient answer rates, transcription effectiveness, and/or the like, which can provide invaluable information on marketing effectiveness and potential adjustments to marketing strategies.

One or more aspects of the subject disclosure include a device, comprising a processing system including a processor, and a memory that stores executable instructions that, when executed by the processing system, facilitate performance of operations. The operations can include detecting, over a network, a call originating from a call originator and intended for a user of a user equipment and, responsive to the detecting the call, determining whether to challenge the call originator. Further, the operations can include, based on a determination to challenge the call originator, transmitting a request to the call originator, wherein the request prompts the call originator to specify an identity of the call originator and a purpose for the call. Further, the operations can include obtaining information from a call originator input responsive to the transmitting the request, deriving enhanced Caller Name or Caller ID data that includes the information, and causing the enhanced Caller Name or Caller ID data to be provided to the user equipment, thereby enabling the user of the user equipment to determine whether to answer the call.

One or more aspects of the subject disclosure include a non-transitory machine-readable medium, comprising executable instructions that, when executed by a processing system of a user equipment including a processor, facilitate performance of operations. The operations can include receiving, over a network from a network system, a call from a call originator and directed to the user equipment. Further, the operations can include obtaining, from the network system, data that includes information regarding an identity of the call originator, a purpose for the call, or a combination thereof, wherein the data is provided to the user equipment based on the network system determining, responsive to detecting the call from the call originator directed to the user equipment, to challenge the call originator, requesting the call originator to provide the information based on the determining to challenge the call originator, and receiving the information from a call originator input after the requesting the call originator to provide the information. Further, the operations can include causing the data to be presented on the user equipment responsive to the obtaining the data from the network system.

One or more aspects of the subject disclosure include a method. The method can comprise detecting, by a processing system including a processor, and over a network, a call directed to a user of a user equipment, wherein the call originates from a call originator. Further, the method can include, responsive to the detecting the call, determining, by the processing system, whether to present a query to the call originator, wherein the query prompts the call originator to specify an identity of the call originator and a reason for the call. Further, the method can include, based on a determination to present the query to the call originator, causing, by the processing system, the query to be presented to the call originator, and receiving, by the processing system, information from a call originator input responsive to the causing the query to be presented to the call originator. Further, the method can include generating, by the processing system, a short message service (SMS) message that includes data based on the information, and transmitting, by the processing system, the SMS message to the user equipment to permit the user of the user equipment to decide on whether to answer or ignore the call.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, certain operations, including detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
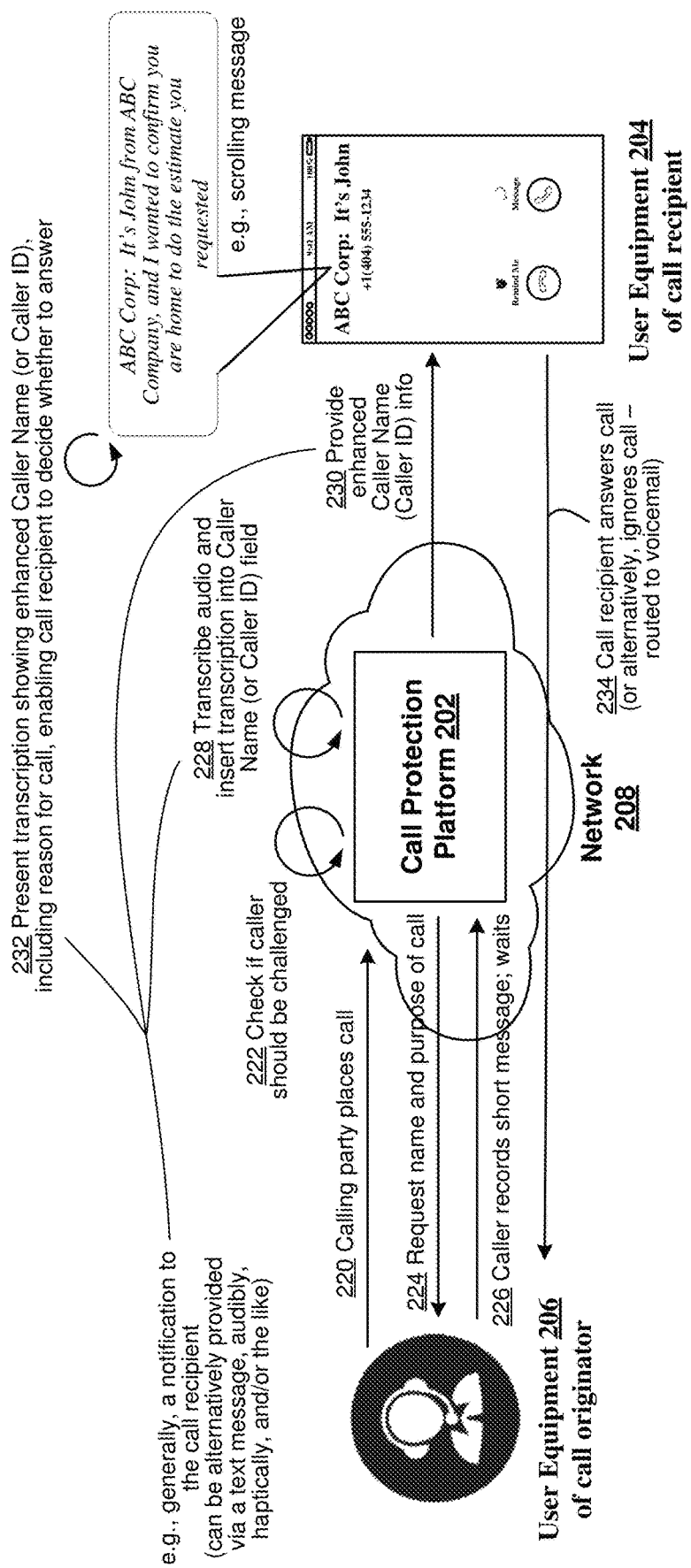
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or overlaid upon, the communications network of FIG. 1 in accordance with various aspects described herein.

As shown in FIG. 2A, the system 200 may include a call protection platform 202 and a network 208. The call protection platform 202 may be implemented in one or more computing devices, such as one or more server devices. The network 208 may include one or more wired and/or wireless networks. For example, the network 208 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In exemplary embodiments, the network 208 may include an Internet Protocol (IP) Multimedia Core Network Subsystem (IMS) or the like and/or an evolved packet core (EPC) or the like.

As depicted in FIG. 2A, the system 200 may also include a user equipment 204 associated with a first user or a call recipient, and a user equipment 206 associated with a second user or a call originator. Each of the user equipment 204 and 206 may include a communication and/or computing device, such as a mobile phone (e.g., a smart phone, a radiotelephone, etc.), a wearable communication device (e.g., a smart wristwatch, a pair of smart eyeglasses, media-related gear (e.g., augmented reality (AR), virtual reality (VR), or mixed reality (MR) glasses and/or headset/headphones), etc.), a similar type of device, or a combination of some or all of these devices.

In various embodiments, the call protection platform 202 may be capable of facilitating a call between the call originator and the call recipient, and more particularly, ascertaining, or otherwise identifying, from the call originator, the intent of the call, and conveying information regarding that intent to the call recipient in real-time (or near real-time). As shown by reference number 220, the call protection platform 202 may receive or detect a call from the user equipment 206 (call originator) intended for the user equipment 204 (call recipient). As shown by reference number 222, the call protection platform 202 may determine if the call originator should be challenged. In various embodiments, the call protection platform 202 may perform pre-filtering of incoming calls, such that not all incoming calls may be challenged. In one or more embodiments, the call protection platform 202 may determine whether an incoming call satisfies one or more conditions, and may determine to challenge the caller in a case (e.g., only in a case) where the one or more conditions are not satisfied. Example conditions can include the caller being identified in the call recipient's contact or address list/book (e.g., friends, family, colleagues, etc.), the caller being identified in a call history associated with the call recipient (e.g., where one or more prior calls have call/connection times that exceed a threshold time or the like), the caller being authenticated or verified (e.g., by the network system 208), the call being identified as an emergency call (e.g., the call originating from a known or trusted emergency calling system), and/or the like. Alternatively, the call protection platform 202 may determine whether the incoming call satisfies one or more other conditions, and may determine to challenge the caller in a case (e.g., only in a case) where these one or more other conditions are satisfied. Examples of such other condition(s) can include the caller being identified as a possible illegal robocaller (e.g., an auto warranty robocaller, etc.), the originating caller number being blacklisted by a system, and/or the like.

Performing filtering or pre-filtering of calls can limit call challenges to those cases (e.g., only those cases) where the call recipient is likely to ignore or avoid answering the call, can reduce call recipient and/or call originator annoyance from unneeded challenges, and can minimize usage of network resources that might otherwise be expended if all calls are challenged. Implementing call challenging in cases where certain predefined conditions are (or are not) satisfied also gives the call recipient the opportunity to decide on whether to answer the call. In this way, even in a case where an incoming call is determined to be a marketing call (e.g., based on the originating caller's number and/or historical information regarding the call originator), for example, and where the call recipient might actually be interested in the marketed product or service, the call can simply be challenged, rather than blocked, thereby providing the call recipient a chance to accept the call if desired.

As shown by reference number 224, the call protection platform 202 may, based upon determining that the call originator should be challenged, request that the call originator provide identifying information and/or a purpose for the call. In various embodiments, the call protection platform 202 may cause a pre-recorded audio message to be played back to the call originator that prompts the call originator to provide the call originator's identity (e.g., the caller's name, company name, etc.) and/or a reason for the call.

As shown by reference number 226, the call originator may provide a message in response to the request, and the call protection platform 202 may obtain a recording thereof. For example, the call originator may speak into an audio input device (e.g., a microphone or the like) of the user equipment 206, and provide information regarding an identity of the call originator (e.g., a name, a company name, etc.) and a reason for the call (e.g., school closure alert, auto recall notice, etc.). In various embodiments, the recording may be limited to a particular (short) time period, such as five seconds, ten seconds, fifteen seconds, and/or the like, so as to avoid delaying a potentially legitimate call from being connected. For example, the call protection platform 202 may (e.g., may only) capture a recording for a duration of five seconds, ten seconds, etc. In some cases, the call originator may be an automated system that is configured to output a pre-recorded audible message. In such cases, the call originator may not necessarily respond to the challenge request, but may rather merely output the audible message upon being communicatively coupled with the call protection platform 202. In any case, the call protection platform 202 may nevertheless obtain a recording of a response message and process it, as described in more detail below. In certain embodiments, the call protection platform 202 may additionally, or alternatively, provide a mechanism for the call originator to input, via the user equipment 206, text data that identifies the call originator's identity and reason for calling. In these embodiments, the call protection platform 202 may similarly obtain any such text data inputted via the user equipment 206.

As shown by reference number 228, the call protection platform 202 may process the recording, such as by transcribing audio data in the recording. In exemplary embodiments, the call protection platform 202 may insert a resulting transcription into a caller identifier field. The caller identifier field may, for example, be a Caller Name (or Caller ID) field in which an originating caller number and/or a name associated with the originating caller number is generally specified or provided, such as via a Calling Name Presentation (CNAM) service or the like that obtains the name/number from a database. In various embodiments, the call protection platform 202 may utilize a speech-to-text conversion function, a natural language processing function, and/or the like to transform the audio data into text data, and may insert the text data into the caller identifier field— e.g., resulting in enhanced Caller Name (or Caller ID) information.

As shown by reference number 230, the call protection platform 202 may provide caller identifier information to the user equipment 204. For example, the call protection platform 202 may provide a communication or message that includes the enhanced Caller Name (or Caller ID) information to the user equipment 204. As shown by reference number 232, the user equipment 204 may present (e.g., display) the transcription in the Caller Name (or Caller ID) field, as an enhanced Caller Name (or enhanced Caller ID), enabling the call recipient to quickly make an informed decision on whether to answer the call. In some embodiments, as shown in FIG. 2A, the user equipment 204 may present the transcription (e.g., as a scrolling message) beginning with the caller's name and/or phone number (e.g., as obtained via a CNAM service or the like), followed by, or appended with, the transcription.

As shown by reference number 234, in a case where the call recipient decides to answer the call (e.g., such as by providing an answer-call input or the like to the user equipment 204), the call protection platform 202 and/or the network 208 may permit a connection between the user equipment 204 and the user equipment 206 to be established to facilitate the call. Alternatively, in a different case where the call recipient chooses not to answer the call, the call protection platform 202 and/or the network 208 may (e.g., within a threshold period of time of the call being received at the user equipment 204) route the call to a voicemail system.

In certain embodiments, steps 222, 224, 226, 228, 230, and/or 232 may be performed while the call is being received by (e.g., is ringing on) the user equipment 204. For example, while the call is received by (e.g., is ringing on) the user equipment 204, the call protection platform 202 may prompt the call originator for identity and call purpose information, process a transcription of a corresponding recording, and so on, as described above. In one or more embodiments, when the call is initially received by (e.g., is ringing on) the user equipment 204, default Caller Name (or Caller ID) information may be initially provided to the user equipment 204 and presented thereon. In these embodiments, the call protection platform 202 may subsequently add or append the transcript of a recording to the Caller Name (or Caller ID) field to derive the enhanced Caller Name (or enhanced Caller ID), and provide this enhanced information to the user equipment 204 for display/output to the call recipient. In one or more alternate embodiments, when the call is initially received by (e.g., is ringing on) the user equipment 204, the call protection platform 202 may prevent any default Caller Name (or Caller ID) information from being provided to the user equipment 204 for display/output. In these alternate embodiments, the call protection platform 202 may instead first add or append the transcript of a recording to the Caller Name (or Caller ID) field to derive enhanced Caller Name (or enhanced Caller ID) information, and then provide the enhanced information to the user equipment 204 for display/output to the call recipient.

In various embodiments, the call protection platform 202 may additionally, or alternatively, provide information (regarding the identity of the caller and the reason for the call) to the user equipment 204 in one or more other manners. As one example, the call protection platform 202 may transmit the transcription to the user equipment 204 via a text message, such as a short message service (SMS) message. As another example, the call protection platform 202 may provide, to the user equipment 204, the actual recording obtained from prompting the user equipment 206, along with an instruction to the user equipment 204 to play back that recording to the call recipient. As yet another example, the call protection platform 202 may provide the transcription to the user equipment 204 along with an instruction to the user equipment 204 to convert the transcription such that it can be presented audibly (e.g., by a virtual assistant, such as a smartphone artificial intelligence (AI) system or the like) or haptically. Presenting the information audibly can accommodate call recipients who may be visually impaired. In various embodiments, the call protection platform 202 may transmit the text message, the actual recording, etc. to the user equipment 204 while the call is being received at (e.g., is ringing on) the user equipment 204. In these embodiments, the call recipient may simply answer or ignore the call based on a review of the text message or recording.

In certain embodiments, the call protection platform 202 may provide the above-described enhanced Caller Name (or enhanced Caller ID), the text message, or the recording, before the call is actually received at (or before the call is ringing on) the user equipment 204. For example, in a case where the call protection platform 202 is capable of providing enhanced Caller Name (or enhanced Caller ID) as described above, the call protection platform 202 may, after detecting an incoming call to the call recipient, first prevent the call from being received at (or prevent the call from ringing on) the user equipment 204, prompt the call originator to provide the identity/call reason information, and obtain a recording thereof. Continuing the example, upon deriving a transcription of the recording, the call protection platform 202 may then generate enhanced Caller Name (or enhanced Caller ID) information using the transcription, provide the enhanced information to the user equipment 204, and permit the call to be received at (or ring on) the user equipment 204. As another example, in a case where the call protection platform 202 is capable of providing the recording or a text message containing a transcription of the recording as described above, the call protection platform 202 may, after detecting an incoming to the call recipient, first prevent the call from being received at (or prevent the call from ringing on) the user equipment 204, obtain the recording and/or a transcription thereof, and then provide the recording or text message to the user equipment 204. In this example, the call protection platform 202 may also (e.g., simultaneously, substantially simultaneously, or thereafter) permit the call to be received at (or ring on) the user equipment 204 to enable the call recipient to manually answer the call if desired. Alternatively, and continuing the example, the call protection platform 202 may provide, along with the recording or text message, a user selectable input (or other response mechanism, such as a reply message option or the like) for the call recipient to choose to accept or ignore the call. Here, in a case where the call protection platform 202 receives a user selection to accept the call, the call protection platform 202 can then automatically connect the call, or alternatively, permit the call to be received at (or ring on) the user equipment 204, where the call recipient can then manually answer the call. Otherwise, if the call protection platform 202 does not receive a user selection to accept the call (e.g., within a threshold period of time), the call protection platform 202 may prevent the call from being received at (or prevent the call from ringing on) the user equipment 204.

It is to be appreciated and understood that the call protection platform 202 may, for a given incoming call, operate without requiring input (e.g., any manual input) from a call recipient. In this way, the call protection functions described herein can be performed seamlessly in the background. In certain embodiments, the call protection platform 202 may alternatively provide a user selectable option for the call recipient to initiate a call challenge process for an incoming call.

In various embodiments, steps 228, 230, and/or 232 may be performed while the call originator is waiting or on hold. In some embodiments, the call protection platform 202 may, after obtaining a recording responsive to the above-described prompting or querying of the call originator, instruct the user equipment 206 to present a notification to the call originator to wait or briefly hold (e.g., for a moment, for a certain amount of time, such as ten seconds or fifteen seconds, etc.). This provides time for the call protection platform 202 to process the recording and present the information contained therein to the call recipient, and for the call recipient to make a decision on whether to answer the call.

In one or more embodiments, the call protection platform 202 may limit the length of the transcribed message. This can avoid displaying (or scrolling) too lengthy of a message, which may otherwise be intrusive to the call recipient and/or may unnecessarily delay connection of a potentially legitimate call should the call recipient be compelled to read a lengthy transcription before deciding on whether to answer a call. In a case where the Caller Name/ID field is capped at a certain number of characters—e.g., 256 characters or the like—the call protection platform 202 may, for example, limit (e.g., truncate) a transcribed message, such that, along with a default Caller Name (or Caller ID) value, the total length of the default Caller Name (or Caller ID) value and the added/appended transcription is 256 characters or fewer.

In various embodiments, providing a notification regarding an incoming call (e.g., in the form of a transcription, as described herein) may or may not interrupt certain types of applications, such as media-based applications (e.g., a music application, a video application, etc.) that are currently being executed on the user equipment 204. For example, in certain embodiments, before or while the call is received at (or is ringing on) the user equipment 204, the call protection platform 202 may (e.g., based on one or more user settings or the like) provide, along with the transcript (or recording) for the call, an instruction to the user equipment 204 to modify its default behavior such that content of a media-based application continues to be presented on the user equipment 204, rather than being paused or stopped. In this example, presentation of the content may continue until (e.g., only after) the call recipient selects to answer the call, and thus can prevent the presentation from being unnecessarily interrupted by potentially unwanted calls.

In various embodiments, the call protection platform 202 may provide a notification regarding an incoming call (e.g., in the form of a transcription, as described herein), and the user equipment 204 may present the notification, regardless of whether the user equipment 204 is communicatively coupled with an accessory device, such as a headset, headphones, a wearable device (e.g., a smartwatch), or the like. In some embodiments, the call protection platform 202 may provide, along with the transcript (or recording) for the call, an instruction to the user equipment 204 to modify its default behavior such that, in a case where the user equipment 204 is communicatively coupled with an accessory device, such as a Bluetooth headset or a smartwatch, the user equipment 204 may, based upon detecting that the accessory device (and thus the call recipient) is located beyond a threshold distance from the user equipment 204, cause the notification to be presented (e.g., only presented) on the accessory device and not on the user equipment 204 and/or cause the accessory device to ring and not the user equipment 204.

In various embodiments, the call protection platform 202 can employ machine learning algorithm(s) that are configured to learn a user's (a call recipient's) behavior or preferences for answering, ignoring, and/or blocking calls. This can include, for example, the user's reactions to a post-call challenge recording or recording transcription. In one or more embodiments, the call protection platform 202 may adjust, based on the learned information, future actions performed by, or outputs provided by, the call protection platform 202 to improve user experience. For example, in some embodiments, the call protection platform 202 may provide information regarding a user's preferences or behavior as input to one or more machine learning algorithms, which may perform machine learning to automate future determinations or predictions of user preferences or behavior. For instance, the call protection platform 202 may train a machine learning algorithm based on known inputs (e.g., a recording or a transcription thereof indicating certain names, certain company names, certain call reasons, and/or the like) and known outputs (e.g., the user choosing to answer calls associated with certain names, certain company names, or certain call reasons; the user ignoring calls associated with other names, other company names, or other call reasons; etc.). In some implementations, the call protection platform 202 may decide not to challenge certain calls based on the learnings (e.g., not to challenge calls associated with certain names, certain company names, or certain call reasons (e.g., relating to school, medical, or the like), etc.) and/or may decide to challenge other calls based on the leanings (e.g., to challenge calls associated with other names, other company names, or other call reasons (e.g., relating to likely fraudulent matters, such as those regarding auto warranties, social security numbers, or passwords), etc.).

In one or more embodiments, the call protection platform 202 may train a machine learning algorithm to identify a user's reactions to unchallenged calls, and perform one or more actions in accordance with such reactions. For instance, in a case where the call protection platform 202 detects that the user has ignored or rejected an individual's calls (e.g., an individual who is identified in the user's contact list or who is otherwise determined to be acquainted with the user) for more than a threshold number of times, the call protection platform 202 may, upon detecting a subsequent incoming call from that individual, decide to challenge the individual, provide a resulting recording or transcription thereof to the user, and so on, as described herein, so as minimize interruptions by the individual. In some embodiments, the call protection platform 202 may, prior to challenging the individual, request the user's permission to do so and/or obtain a message from the user that the user wishes to have relayed to the individual should the individual make a subsequent call to the user. In various embodiments, and in a case where the call protection platform 202 challenges the individual, the call protection platform 202 may initiate a timer (e.g., for several hours, for a day, etc.) and, upon expiration of the timer, disable call challenging for the individual or otherwise request the call recipient for instructions on whether to continue challenging the individual's calls.

In some embodiments, the call protection platform 202 may train a machine learning algorithm to compare identified names, company names, or call reasons with stored information regarding a call recipient's historical (e.g., recent) activities, and utilize that information to determine whether to challenge a caller. For example, in a case where the call protection platform 202 determines (e.g., from the user's purchase history, social media posts, calendar items, and/or the like) that the call recipient recently purchased a vehicle with a free trial for a satellite radio service, and detects that an automated marketing call associated with the satellite radio service provider is incoming for the call recipient, the call protection platform 202, rather than perhaps merely blocking the marketing call, may instead challenge the call, as described herein, thereby leaving open the possibility that the call recipient may in fact be interested in subscribing to the satellite radio service and providing an opportunity for the call recipient to answer the call.

In exemplary embodiments, the call protection platform 202 may provide (e.g., via a graphical user interface (GUI) or the like) user selectable settings for a user to opt-in and opt-out, or otherwise enable and disable, one or more of the features/functionalities of the call protection platform 202 described herein.

In various embodiments, the call protection platform 202 may be configured to transcribe recordings in any suitable language, such as based on the language used in the recording, based on settings defined by the call recipient, and/or the like. For example, in a case where the call protection platform 202 determines, based on an analysis of an obtained recording, that the recording is in a particular language (e.g., French), the call protection platform 202 may transcribe the recording in that particular language. As another example, in a case where the call protection platform 202 determines, based on an analysis of an obtained recording, that the recording is in a particular language (e.g., French), but where the call recipient has previously defined a setting to have transcriptions be in a certain language (e.g., English), the call protection platform 202 may transcribe the recording in that certain language and include an indication (e.g., in the enhanced Caller Name (or Caller ID) field, via an SMS message, etc.) to the call recipient of the original language in the recording. In some embodiments, the call protection platform 202 may, based upon detecting that the language in a recording (e.g., French) does not correspond to a default language set by the call recipient, provide an indication to the call recipient of the language in the recording, with or without a transcription of the recording. Providing such an indication can enable the call recipient to quickly discern whether a call may be fraudulent, may contain spam, or may otherwise be unwanted (such as in the event that the call recipient does not speak any language other than English) and to either ignore or block the call.

In this way, the call protection platform 202 advantageously obtains and provides information regarding a caller's identity and call intent regardless of whether a private caller ID feature is enabled or disabled by the caller and regardless of whether there exists a caller name associated with the call originator's number in a default database.

Although the call protection platform 202 has been described above as being implemented in the network 208, it is to be appreciated and understood that some or all of the aspects or functionalities of the call protection platform 202 may additionally, or alternatively, be implemented in another device, such as the user equipment 204 or an associated device. For example, some or all of the aspects or functionalities of the call protection platform 202 may be implemented in an application or software package installed, or otherwise operating, on the user equipment 204 or an associated device, and/or may be executed and synchronized across these devices.

Figure 2B:
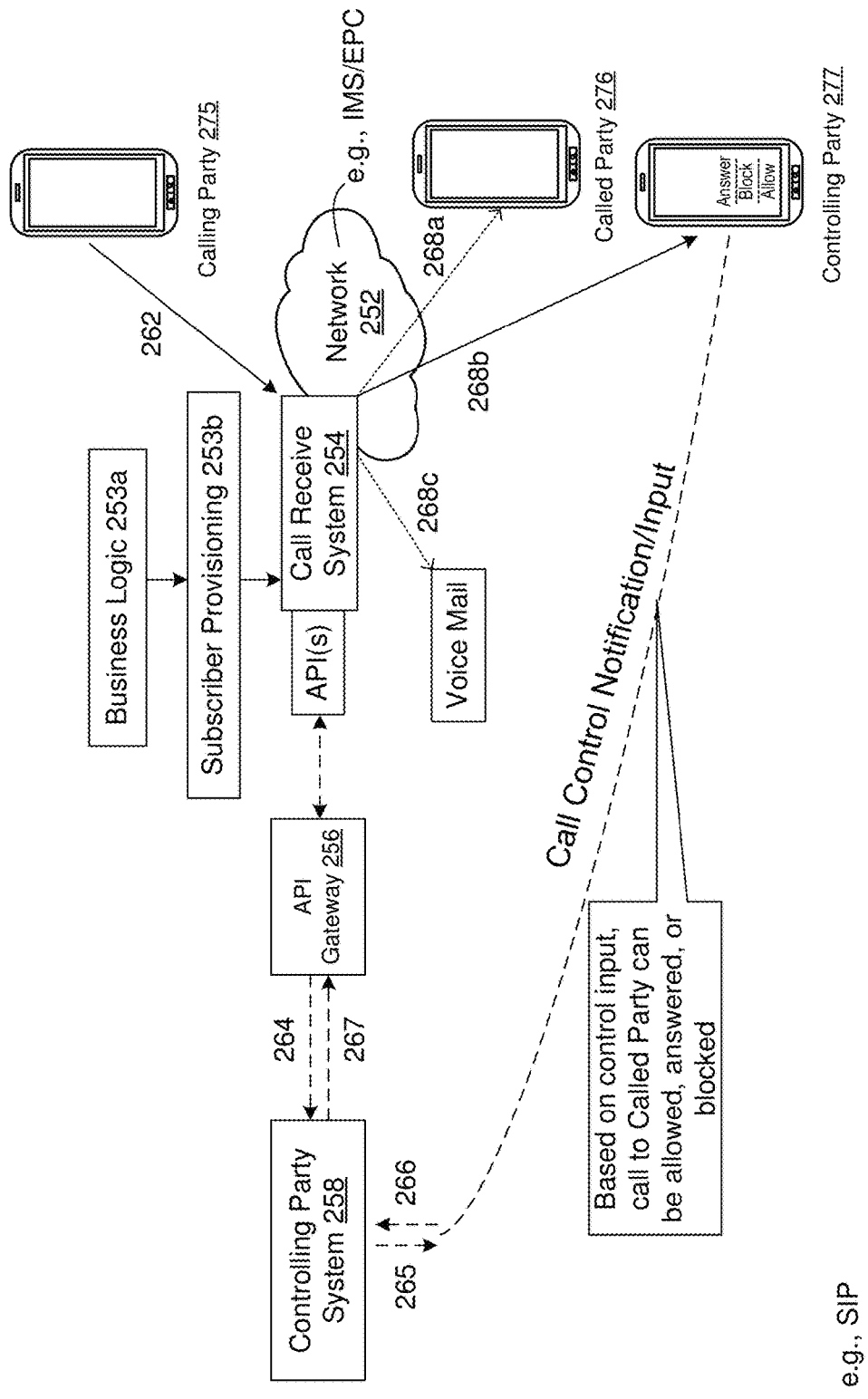
FIG. 2B is a block diagram illustrating an example, non-limiting embodiment of a system functioning in, or in conjunction with, the communications network of FIG. 1 and/or the system of FIG. 2A in accordance with various aspects described herein.

FIG. 2B is a block diagram illustrating an example, non-limiting embodiment of a system 250 functioning within, or operatively overlaid upon, the communications network of FIG. 1 in accordance with various aspects described herein. In various embodiments, some or all of the aspects of the call protection platform 202 of the system 200 of FIG. 2A may be implemented in or provided by one or more devices or components of the system 250 of FIG. 2B. For example, in one or more embodiments, the system 250 may be capable of challenging a caller, ascertaining a name and reason for the call, and providing that information to a call recipient. In exemplary embodiments, the system 250 may enable a controlling party (e.g., a third-party system or the like) to interact with a network provider system to provide call challenging functionalities. As depicted, the system 250 may include a network system 252 (which may, for example, correspond to a mobile network provider and include an EPC, IMS functionality for facilitating voice-over-Long Term Evolution (VoLTE) calls, and/or the like), business logic functionality 253a, subscriber provisioning functionality 253b, a call receive system 254 (e.g., associated with or included in the network 252), an application programming interface (API) gateway 256, and a controlling party system 258. The API gateway 256 may enable the call receive system 254 and the controlling party system 258 to communicate with one another via one or more APIs (e.g., using HyperText Transfer Protocol (HTTP) or the like). As shown by reference number 262, a call, originating from a calling party device 275 and directed to a called party device 276, may be received (e.g., via Session Initiation Protocol or the like) by the call receive system 254, which can provide (264) an indication of the call to the controlling party system 258. The controlling party system 258 can provide (265) a call control notification to a controlling party device 277 (e.g., a user equipment or a server/platform, such as the call protection platform 202 or the like), enabling the controlling party device 277, or a user thereof, to decide, via selection of a call control input 266, on whether to allow the call to be connected (268a) to the called party device 276, to answer (268b) the call on the controlling party device 277 (e.g., so as to perform some or all of the various aspects of call challenging, such as prompting the caller for identity information and a reason for the call, obtaining a recording thereof, and/or transcribing the recording, etc.), or to block/ignore (268c) the call. Based on the received call control input 266, the controlling party system 258 may communicate, via the API gateway 256, the selection to the call receive system 254 to be acted upon—e.g., to permit the call to be received (268a) at the called party device 276 (and, for example, permit data regarding the caller identity and call reason to be provided (e.g., via SIP) to the called party device 276); to permit the call to be received/answered (268b) at the controlling party device 277; or to block the call or otherwise route (268c) the call to a voicemail system. In this way, the system 250 can provide an API gateway for a third-party/application verification process/system to implement various aspects of call challenging functionalities described herein.

It is to be understood and appreciated that, although the system 250 may have been described as being distinct from the system 200, some or all of the aspects and/or functionalities of the system 200 may apply to, be included in, or be provided by the system 250. For example, some or all of the aspects and/or functionalities of the call protection platform 202, described above with respect to FIG. 2A, may apply to, be included in, or be provided by one or more components or devices of the system 250.

It is also to be understood and appreciated that the quantity and arrangement of platforms, networks, user equipment, systems, gateways, devices, and/or APIs shown in FIGS. 2A and/or 2B are provided as examples. In practice, there may be additional platforms, networks, user equipment, systems, gateways, devices, and/or APIs, fewer platforms, networks, user equipment, systems, gateways, devices, and/or APIs, or differently arranged platforms, networks, user equipment, systems, gateways, devices, and/or APIs than those shown in FIGS. 2A and 2B. For example, each of the system 200 and the system 250 can include more or fewer platforms, networks, user equipment, systems, gateways, devices, and/or APIs, etc. Furthermore, two or more platforms, networks, user equipment, systems, gateways, devices, and/or APIs shown in one or more of FIGS. 2A and 2B may be implemented within a single platform, network, user equipment, system, gateway, device, or API, or a single platform, network, user equipment, system, gateway, device, or API shown in one or more of FIGS. 2A and 2B may be implemented as multiple, distributed platforms, networks, user equipment, systems, gateways, devices, or APIs. Additionally, or alternatively, a set of platforms, networks, user equipment, systems, gateways, devices, and/or APIs (e.g., one or more platforms, networks, user equipment, systems, gateways, devices, and/or APIs) of the system 200 or of the system 250 may perform one or more functions described as being performed by another set of platforms, networks, user equipment, systems, gateways, devices, and/or APIs of the system 200 or of the system 250.

Figure 2C:
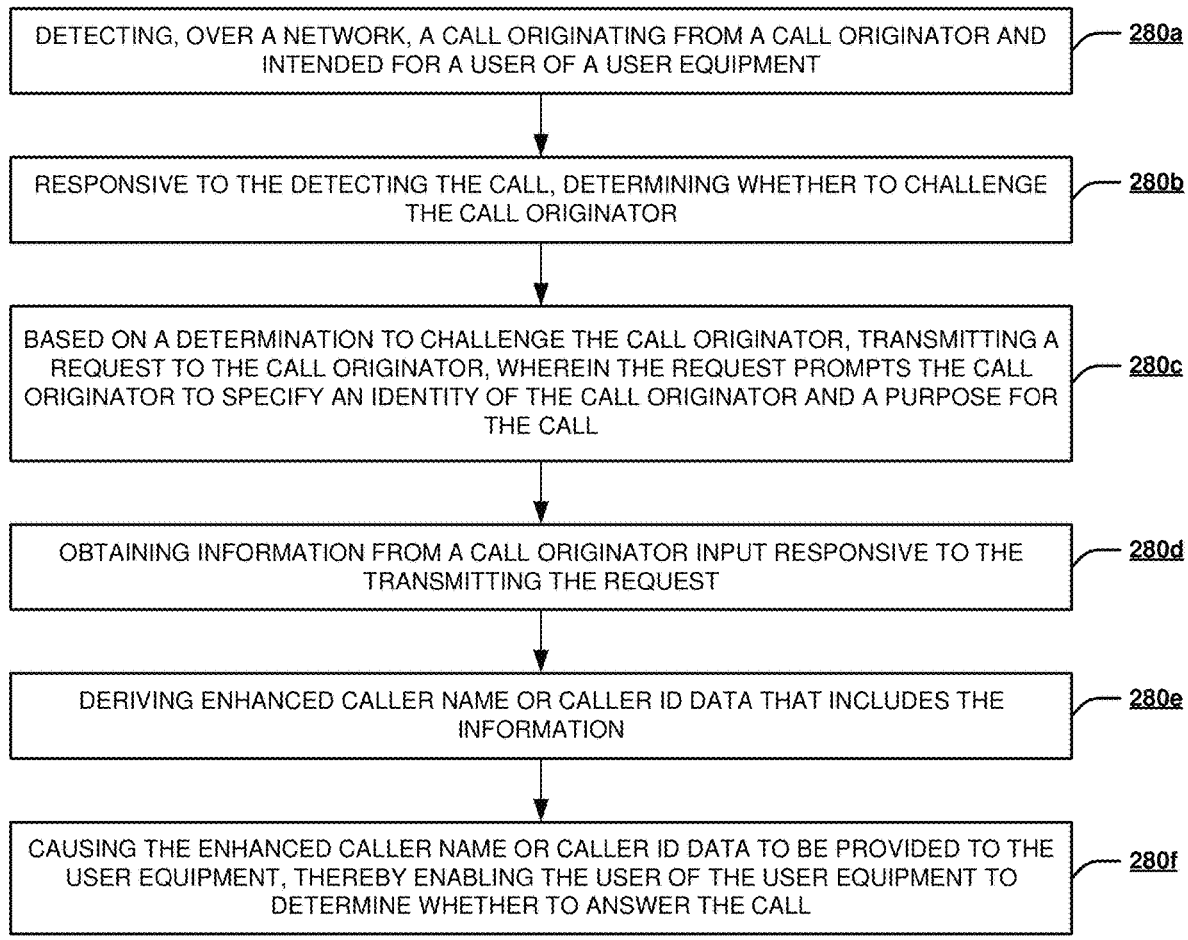
FIG. 2C depicts an illustrative embodiment of a method in accordance with various aspects described herein.

FIG. 2C depicts an illustrative embodiment of a method 280 in accordance with various aspects described herein. In some embodiments, one or more process blocks of FIG. 2C can be performed by a call protection platform, such as the call protection platform 202 of FIG. 2A and/or the controlling party system 258/controlling party device 277 of FIG. 2B. In some embodiments, one or more process blocks of FIG. 2C may be performed by another device or a group of devices separate from or including the call protection platform 202 and/or the controlling party system 258/controlling party device 277, such as the user equipment 204, the user equipment 206, the network 208, the network 252, the business logic system 253a, the subscribing provisioning system 253b, the call receive system 254, the calling party device 275, the called party device 276, and/or the API gateway 256.

At 280a, the method can include detecting, over a network, a call originating from a call originator and intended for a user of a user equipment. For example, the call protection platform 202 and/or the controlling party system 258/controlling party device 277 can detect, over a network, a call originating from a call originator and intended for a user of a user equipment in a manner similar to that described above with respect to the system 200 of FIG. 2A and/or the system 250 of FIG. 2B.

At 280b, the method can include, responsive to the detecting the call, determining whether to challenge the call originator. For example, the call protection platform 202 and/or the controlling party system 258/controlling party device 277 can, responsive to the detecting the call, determine whether to challenge the call originator in a manner similar to that described above with respect to the system 200 of FIG. 2A and/or the system 250 of FIG. 2B.

At 280c, the method can include, based on a determination to challenge the call originator, transmitting a request to the call originator, wherein the request prompts the call originator to specify an identity of the call originator and a purpose for the call. For example, the call protection platform 202 and/or the controlling party system 258/controlling party device 277 can, based on a determination to challenge the call originator, transmit a request to the call originator in a manner similar to that described above with respect to the system 200 of FIG. 2A and/or the system 250 of FIG. 2B, where the request prompts the call originator to specify an identity of the call originator and a purpose for the call.

At 280d, the method can include obtaining information from a call originator input responsive to the transmitting the request. For example, the call protection platform 202 and/or the controlling party system 258/controlling party device 277 can obtain information from a call originator input responsive to the transmitting the request in a manner similar to that described above with respect to the system 200 of FIG. 2A and/or the system 250 of FIG. 2B.

At 280e, the method can include deriving enhanced Caller Name or Caller ID data that includes the information. For example, the call protection platform 202 and/or the controlling party system 258/controlling party device 277 can derive enhanced Caller Name or Caller ID data that includes the information in a manner similar to that described above with respect to the system 200 of FIG. 2A and/or the system 250 of FIG. 2B.

At 280f, the method can include causing the enhanced Caller Name or Caller ID data to be provided to the user equipment, thereby enabling the user of the user equipment to determine whether to answer the call. For example, the call protection platform 202 and/or the controlling party system 258/controlling party device 277 can cause the enhanced Caller Name or Caller ID data to be provided to the user equipment in a manner similar to that described above with respect to the system 200 of FIG. 2A and/or the system 250 of FIG. 2B, thereby enabling the user of the user equipment to determine whether to answer the call.

In various embodiments, the determining whether to challenge the call originator may comprise determining whether the call originator is identified in a contact list associated with the user.

In some embodiments, the determining whether to challenge the call originator may comprise determining whether there exists a prior call history between the call originator and the user.

In certain embodiments, the determining whether to challenge the call originator may comprise determining whether the call originator is associated with an emergency calling system.

In one or more embodiments, the determining whether to challenge the call originator may comprise determining whether the call originator is an authenticated caller.

In various embodiments, the information may comprise an audio recording. In some embodiments, the method may include transcribing the audio recording, resulting in a transcription. In certain embodiments, the deriving the enhanced Caller Name or Caller ID data may comprise adding or appending the transcription to a Caller Name or Caller ID field.

In one or more embodiments, the method may include, after the obtaining the information from the call originator input, providing an indication to the call originator to hold.

In various embodiments, the transmitting the request, the obtaining the information from the call originator input, the deriving the enhanced Caller Name or Caller ID data, and the causing the enhanced Caller Name or Caller ID data to be provided to the user equipment may be performed while the call is being received at, or ringing on, the user equipment but not yet answered.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of systems 100, 200, and/or 250 and method 280 presented in FIGS. 1, 2A-2C, and 3. For example, virtualized communications network 300 can facilitate, in whole or in part, certain operations, including detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
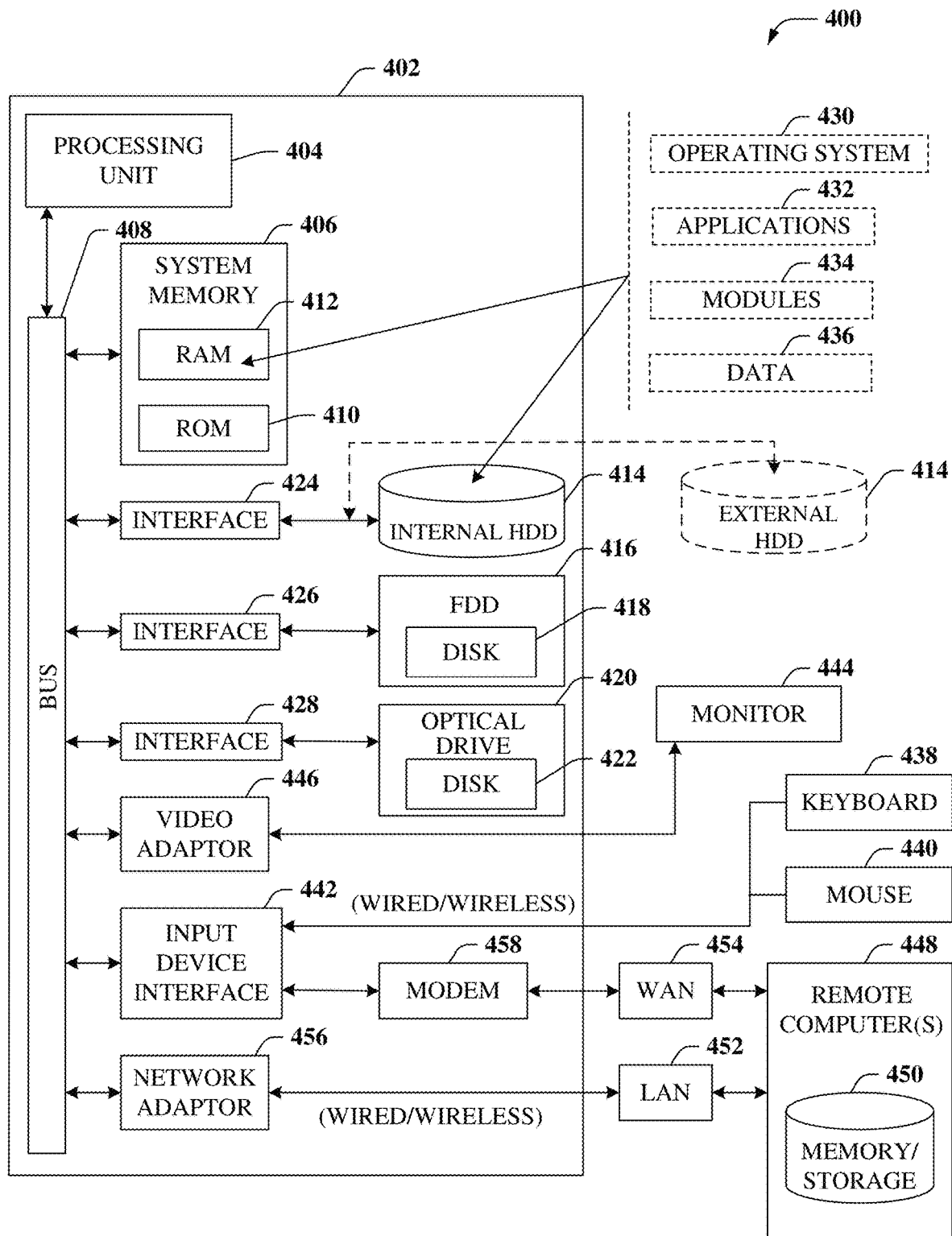
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, certain operations, including detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD)

416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
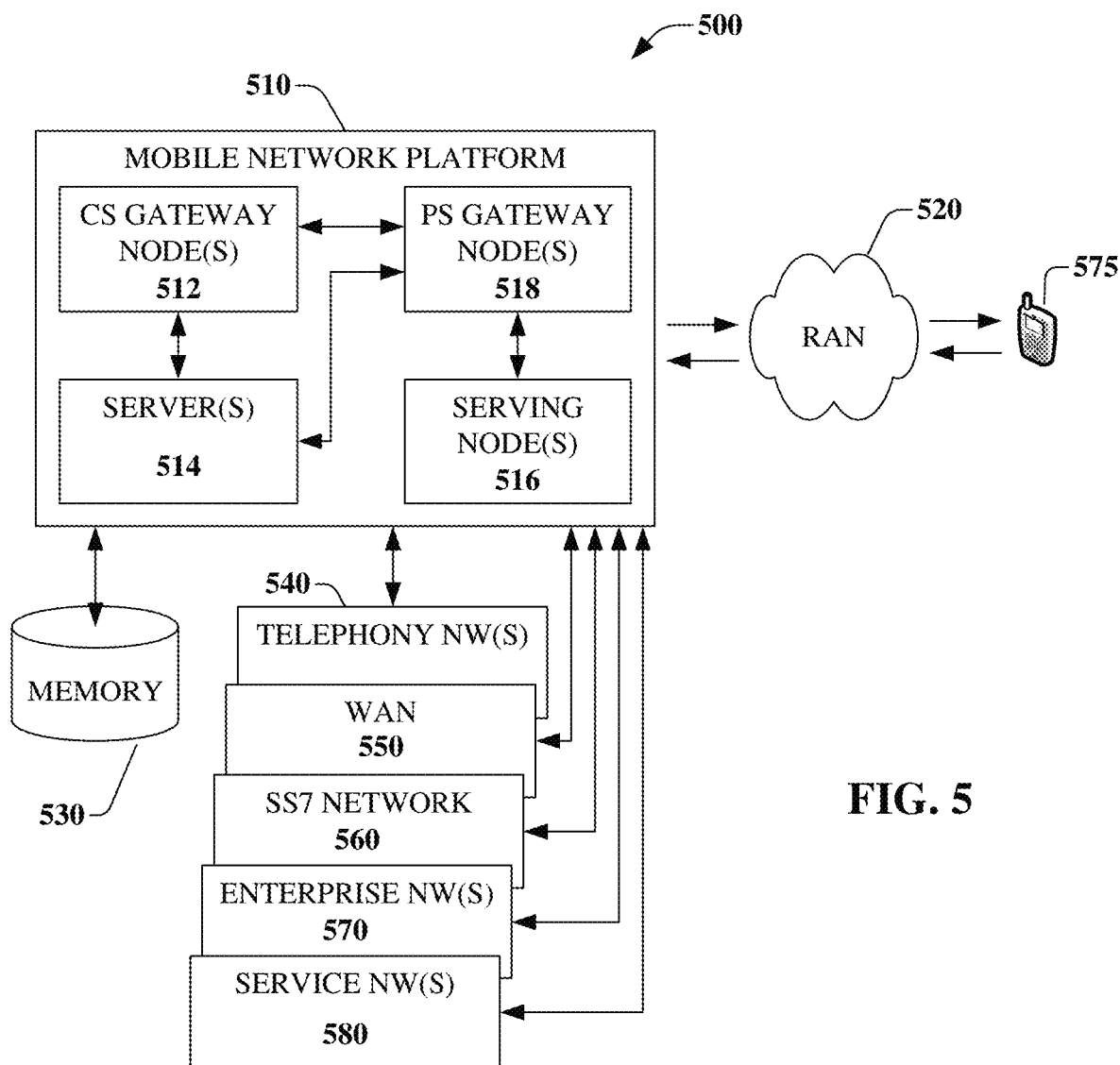
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, certain operations, including detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
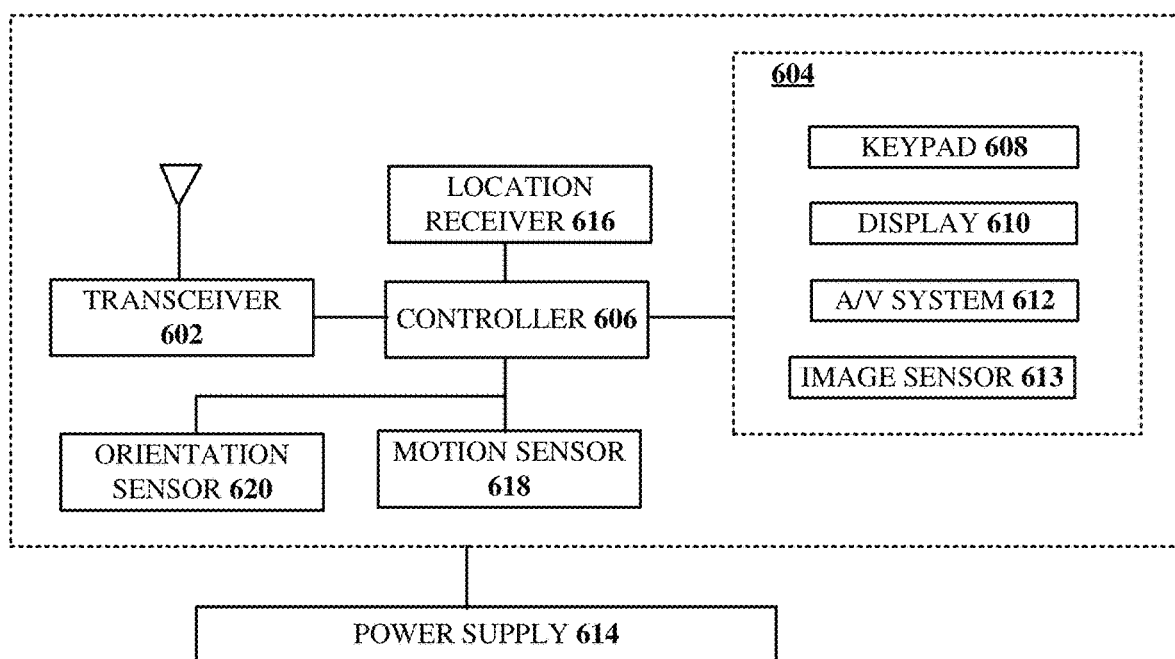
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, certain operations, including detecting a call originating from a caller and directed to a call recipient, determining whether to challenge the caller, and based on a determination to challenge the caller, ascertaining, or otherwise identifying, from the caller, an identity of the caller and an intent of the call, and conveying that information, in real-time (or near real-time), as a notification to the call recipient prior to the call recipient answering the call (e.g., pre-answer).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
 detecting, over a network, a call originating from a call originator and intended for a user of a user equipment;
 based on the detecting, initially providing a default Caller Name or Caller ID to the user equipment;
 responsive to the detecting the call, determining whether to challenge the call originator;
 based on a determination to challenge the call originator, transmitting a request to the call originator, wherein the request prompts the call originator to specify an identity of the call originator and a purpose for the call;
 obtaining information from a call originator input responsive to the transmitting the request;
 transforming the obtained information into text data using a natural language processing technique;
 deriving enhanced Caller Name or Caller ID data by inserting the transformed text data into a Caller Name or Caller ID field, wherein the enhanced Caller Name or Caller ID data further includes the default Caller Name or Caller ID, and wherein the enhanced Caller Name or Caller ID is capped at a predetermined number of characters and the inserted transformed text data is truncated to meet the predetermined number of characters; and
 causing the enhanced Caller Name or Caller ID data to be provided to the user equipment, thereby enabling the user of the user equipment to determine whether to answer the call.

2. The device of claim 1, wherein the determining whether to challenge the call originator comprises determining whether the call originator is identified in a contact list associated with the user.

3. The device of claim 1, wherein the determining whether to challenge the call originator comprises determining whether there exists a prior call history between the call originator and the user.

4. The device of claim 1, wherein the determining whether to challenge the call originator comprises determining whether the call originator is associated with an emergency calling system.

5. The device of claim 1, wherein the determining whether to challenge the call originator comprises determining whether the call originator is an authenticated caller.

6. The device of claim 1, wherein the information comprises an audio recording.

7. The device of claim 6, wherein the operations further comprise transcribing the audio recording, resulting in a transcription.

8. The device of claim 7, wherein the deriving the enhanced Caller Name or Caller ID data comprises adding or appending the transcription to the Caller Name or Caller ID field.

9. The device of claim 1, wherein the operations further comprise, after the obtaining the information from the call originator input, providing an indication to the call originator to hold.

10. The device of claim 1, wherein the transmitting the request, the obtaining the information from the call originator input, the deriving the enhanced Caller Name or Caller ID data, and the causing the enhanced Caller Name or Caller ID data to be provided to the user equipment are performed while the call is being received at, or ringing on, the user equipment but not yet answered.

11. A non-transitory machine-readable medium, comprising executable instructions that, when executed by a processing system of a user equipment including a processor, facilitate performance of operations, the operations comprising:
 receiving, over a network from a network system, a call from a call originator and directed to the user equipment;
 after detecting the call from the call originator, preventing the call from being received at the user equipment;
 obtaining, from the network system, data that includes information regarding an identity of the call originator, a purpose for the call, or a combination thereof, wherein the data is provided to the user equipment based on the network system determining, responsive to detecting the call from the call originator directed to the user equipment, to challenge the call originator, requesting the call originator to provide the information based on the determining to challenge the call originator, and receiving the information from a call originator input after the requesting the call originator to provide the information;
 causing the data to be presented on the user equipment responsive to the obtaining the data from the network system; and
 upon receiving a user selection to accept the call, causing the call to be received at the user equipment.

12. The non-transitory machine-readable medium of claim 11, wherein the obtaining the data comprises obtaining the data via a short message service (SMS) message.

13. The non-transitory machine-readable medium of claim 11, wherein the data comprises enhanced Caller Name or Caller ID data.

14. The non-transitory machine-readable medium of claim 11, wherein the data comprises an audio recording.

15. The non-transitory machine-readable medium of claim 11, wherein the determining to challenge the call originator comprises determining that the call originator is not identified in a contact list associated with a user of the user equipment, that there does not exist a prior call history between the call originator and the user, that the call originator is not associated with an emergency calling system, that the call originator is not an authenticated caller, or a combination thereof.

16. A method, comprising:

detecting, by a processing system including a processor, and over a network, a call directed to a user of a user equipment, wherein the call originates from a call originator;

responsive to the detecting the call, determining, by the processing system, whether to present a query to the call originator, wherein the query prompts the call originator to specify an identity of the call originator and a reason for the call;

based on a determination to present the query to the call originator, causing, by the processing system, the query to be presented to the call originator;

receiving, by the processing system, information from a call originator input responsive to the causing the query to be presented to the call originator;

generating, by the processing system, a short message service (SMS) message that includes data based on the information;

transmitting, by the processing system, the SMS message to the user equipment to permit the user of the user equipment to decide on whether to answer or ignore the call; and providing, by the processing system, an instruction to the user equipment to modify a default behavior such that content of a media-based application continues to be presented on the user equipment until a user selection to answer the call is received.

17. The method of claim 16, wherein the information comprises an audio recording.

18. The method of claim 17, further comprising transcribing the audio recording to derive the data.

19. The method of claim 16, wherein the determining whether to present the query to the call originator comprises determining whether the call originator is identified in a contact list associated with the user.

20. The method of claim 16, wherein the determining whether to present the query to the call originator comprises determining whether there exists a prior call history between the call originator and the user.

* * * * *